US012344496B2

(12) United States Patent
Schweiss et al.

(10) Patent No.: US 12,344,496 B2
(45) Date of Patent: Jul. 1, 2025

(54) CONTAINERS, BLANKS, AND METHODS FOR DISPENSING WEB MATERIAL

(71) Applicant: REYNOLDS CONSUMER PRODUCTS LLC, Lake Forest, IL (US)

(72) Inventors: Thomas Joseph Schweiss, Ingleside, IL (US); Brandon James Burke, Neenah, WI (US)

(73) Assignee: REYNOLDS CONSUMER PRODUCTS LLC, Lake Forest, IL (US)

( * ) Notice: Subject to any disclaimer, the term of this patent is extended or adjusted under 35 U.S.C. 154(b) by 497 days.

(21) Appl. No.: 17/895,524

(22) Filed: Aug. 25, 2022

(65) Prior Publication Data

US 2023/0064890 A1 Mar. 2, 2023

Related U.S. Application Data

(60) Provisional application No. 63/237,402, filed on Aug. 26, 2021.

(51) Int. Cl.

| | |
|---|---|
| ***B65H 35/00*** | (2006.01) |
| ***B31B 100/00*** | (2017.01) |
| ***B31B 120/10*** | (2017.01) |
| ***B65D 5/42*** | (2006.01) |

(52) U.S. Cl.

CPC ............. *B65H 35/002* (2013.01); *B65D 5/42* (2013.01); *B65H 35/0086* (2013.01); *B31B 2100/002* (2017.08); *B31B 2120/102* (2017.08); *B65H 2301/51512* (2013.01); *B65H 2301/5154* (2013.01)

(58) Field of Classification Search

CPC ........................................................ B65D 5/42

See application file for complete search history.

(56) References Cited

U.S. PATENT DOCUMENTS

| | | | | |
|---|---|---|---|---|
| 2,850,157 A * | 9/1958 | Klein | B65D 85/672 | 225/85 |
| 4,095,730 A * | 6/1978 | Clatterbuck | B65H 35/002 | 225/80 |
| 4,787,542 A * | 11/1988 | Ruff | B65H 35/002 | 225/85 |
| 5,732,868 A * | 3/1998 | Gammon, Jr. | B65D 83/0841 | 225/48 |

(Continued)

*Primary Examiner* — William A. Rivera

(74) *Attorney, Agent, or Firm* — Baker Botts L.L.P.

(57) ABSTRACT

Container including base portion defining compartment. Base portion includes bottom panel defining bottom of compartment, front base panel defining front of compartment and extending upwardly from bottom panel. Base portion further includes back panel extending from bottom panel to define a back of compartment, and first and second side tabs extending between bottom panel, front base panel, and back panel at opposing sides thereof to define opposing sides of compartment. Container further includes lid portion including a top panel and a front lid panel. The top panel includes an opening and an access flap moveable between an opening position and a closed position defining the opening. The access flap includes a back edge, a front edge, opposing side edges, and a first and second front protrusions, respectively. Blanks for forming such a container and methods for disposing a web material are also disclosed.

24 Claims, 6 Drawing Sheets

(56) References Cited

U.S. PATENT DOCUMENTS

| | | | | |
|---|---|---|---|---|
| 7,918,151 | B2 | 4/2011 | Vegliante et al. | |
| 7,921,756 | B2 | 4/2011 | Vegliante et al. | |
| D700,837 | S * | 3/2014 | Antal, Sr. | D9/419 |
| 2008/0098868 | A1* | 5/2008 | Guillory | B65H 35/0086 83/649 |
| 2018/0134484 | A1* | 5/2018 | Asada | B65D 25/52 |
| 2018/0141742 | A1* | 5/2018 | Vegliante | B65D 5/16 |
| 2021/0114797 | A1* | 4/2021 | Padilla | B65D 5/5019 |
| 2021/0214150 | A1* | 7/2021 | Vegliante | B65H 35/002 |
| 2022/0340388 | A1* | 10/2022 | Kizer | B65D 85/671 |
| 2023/0150788 | A1* | 5/2023 | Huang | B65H 35/0086 83/614 |
| 2023/0242328 | A1* | 8/2023 | Weaver | B65D 5/0227 229/124 |

* cited by examiner

CONTAINERS, BLANKS, AND METHODS FOR DISPENSING WEB MATERIAL

CROSS REFERENCE TO RELATED APPLICATIONS

This application claims priority to U.S. Provisional Application No. 63/237,402, filed Aug. 26, 2021, which is incorporated by reference in its entirety herein for all purposes.

BACKGROUND

The disclosed subject matter relates to containers for storing and dispensing web material, such as plastic wrap, butcher paper, or other such products.

Various web materials, such as paper, plastic wrap, or other web type products, are available in roll form, such as products used to cover or wrap items. For example, plastic wrap is often used for sealing and securing food items in containers to keep freshness.

A variety of dispensing containers are known to hold rolls of web material, such as wax paper, parchment paper, aluminum foil, plastic wrap and the like. However, conventional dispensing containers generally are not configured to secure a roll therein. Furthermore, properties of certain web material, such as plastic wrap, can cause undesirable effects, such as stretching or clumping of the plastic wrap when dispensed. Additionally, dispensed web material can be difficult to separate from the roll, particularly as web material is frequently dispensed while simultaneously handling items to be wrapped in the dispensed web material, such as food items.

It is therefore desirable to provide a container that can securely contain web material therein and allow for easy dispensing and cutting of the web material.

Additionally, it is desirable to provide a blank for forming such a dispensing container, which can reduce manufacturing complexity, as well as the number of components and costs associated with manufacture of the dispensing container.

SUMMARY

The purpose and advantages of the disclosed subject matter will be set forth in and apparent from the description that follows, as well as will be learned by practice of the disclosed subject matter. For purpose of illustration and not limitation, the various embodiments described herein relate to containers and methods for storing and dispensing a web material packed on a roll, such as plastic wrap or other such products. Additional advantages of the disclosed subject matter will be realized and attained by the containers and methods particularly pointed out in the written description and claims hereof, as well as from the appended drawings.

To achieve these and other advantages, and in accordance with the purpose of the disclosed subject matter, as embodied and broadly described, the disclosed subject matter includes containers and methods for dispensing web material and blanks for forming such containers.

Containers in accordance with the disclosed subject matter include a base portion defining a compartment. The base portion includes a bottom panel defining a bottom of the compartment, a front base panel defining a front of the compartment and extending upwardly from the bottom panel. The base portion further includes a back panel extending from the bottom panel to define a back of the compartment, and a plurality of side tabs extending from at least one of the front base panel, the bottom panel and the back panel to define opposing sides of the compartment.

Containers in accordance with the disclosed subject matter further include a lid portion. The lid portion includes a top panel extending from the back panel along a base-lid hinge line to define a top of the compartment and a front lid panel extending from top front edge of the top panel. The top panel includes a top front edge opposite the base-lid hinge line and first and second top side edges. The top panel includes an access flap defined therein and moveable between a closed position and an open position to define an opening in the top panel for access to the compartment. The access flap includes an access flap back edge, an access flap front edge opposite the access flap back edge, and first and second access flap side edges extending between the access flap back edge and the access flap front edge to define opposing sides of the access flap. The access flap front edge is spaced from top panel front edge to define a front ledge region therebetween. The access flap front edge includes a first front edge protrusion proximate a first end of the access flap front edge and a second front edge protrusion proximate a second end of the access flap front edge.

Additionally or alternatively, each of the first and second front edge protrusions can have a curved shape. Additionally or alternatively, the first front edge protrusion can include a first arc and the second front opening protrusion includes a second arc. As embodied herein, the first and second arcs can each have an arc radius of 16.9 mm.

Additionally or alternatively, the access flap front edge can include a front edge linear portion between the first and second front edge protrusions. The first front edge protrusion can extend towards the top front edge a first front protrusion distance from the front edge linear portion. As embodied herein, the front opening protrusion distance can be about 238 mm. Additionally or alternatively, the front edge linear portion can be parallel with the top front edge and spaced a distance of about 16 mm from the top front edge. Additionally or alternatively, the first front edge protrusion can be disposed between the front edge linear portion and the first access flap side edge, and the second front edge protrusion can be disposed between the front edge linear portion and the second access flap side edge.

Additionally or alternatively, the access flap first side edge can include a first side edge protrusion disposed between access flap front edge and the access flap back edge. The access flap second side edge can include a second side edge protrusion disposed between access flap front edge and the access flap back edge. Additionally or alternatively, the first front edge protrusion can transition into the first side edge protrusion and the second front edge protrusion can transition into the second side edge protrusion. Additionally or alternatively, each of the first and second side edge protrusions can have an angular shape defining a pinnacle. As embodied herein, the pinnacle of each of the first and second side edge protrusions can be spaced apart a distance equal to or greater than a length of roll of web material to be disposed within the compartment.

Additionally or alternatively, the first side edge protrusion can include a first side edge front segment extending from the first front edge protrusion at a first front segment angle of about 120 degrees relative to the top front edge. A first side edge back segment can extend from the first front segment at a first back segment angle of about 45 degrees relative to the base-lid hinge line.

Additionally or alternatively, the access flap back edge can be defined by the base-lid hinge line. As embodied herein, the top panel can further comprise a recess tab defined proximate the access flap front edge between the first front edge protrusion and the second front edge protrusion. Additionally or alternatively, the access flap can be further moveable to a dispensing position to allow a web material from a roll disposed in the compartment to be dispensed between access flap front edge and the front ledge region of the top panel.

Additionally or alternatively, the container can comprise a cutter disposed proximate the top front edge of the top panel. Additionally or alternatively, the container can comprise a roll of web material within the compartment. As embodied herein, the web material can be plastic wrap. Additionally or alternatively, the top panel can further comprise first and second top side tabs extending from the first and second top side edges, respectively. Each of the first and second side tabs can be configured to engage the roll of web material. Additionally or alternatively, the plurality of side tabs can comprise first and second front side tabs extending from the front base panel at opposing sides, first and second bottom side tabs extending from the bottom panel at opposing sides, and first and second back side tabs extending from the back panel at opposing sides.

In accordance with another aspect of the disclosure, a blank for forming a container as disclosed according to the subject matter is disclosed herein. The blank includes a base portion and a lid portion. The base portion includes a front base panel having a front base panel free edge and a front base panel fold line opposite the front base panel free edge. The front base panel has opposing first and second front base side fold lines. The first and second front side tabs extend from the first and second front base side fold lines, respectively. A bottom panel extends from the front base panel fold line to a bottom panel fold line. The bottom panel has opposing first and second bottom side fold lines. The first and second bottom side tabs extend from the first and second bottom side fold lines, respectively. A back panel extends from the bottom panel fold line to a base-lid hinge line. The back panel has opposing first and second back side fold lines, and first and second back side tabs extend from the first and second back side fold lines, respectively.

The lid portion includes a top panel extending from the base-lid hinge line to a top front fold line. The top panel has an access flap defined therein to define an opening in the top panel. The access flap comprises an access flap back edge, an access flap front edge opposite the access flap back edge, and first and second access flap side edges extending between the access flap back edge and the access flap front edge to define opposing sides of the access flap. The access flap front edge is spaced from top panel front edge to define a front ledge region therebetween, and the access flap front edge has a first front edge protrusion proximate a first end of the access flap front edge and a second front edge protrusion proximate a second end of the access flap front edge. A front lid panel extends from the top front fold line.

In accordance with the disclosed subject matter, a method of dispensing web material from a roll using a container is disclosed. Methods in accordance with the disclosed subject matter include providing a container in accordance with the disclosed subject matter and disposing a roll of web material in the container, disposing a roll of web material in the container, and dispensing the web material from the roll through an opening of the container as disclosed herein.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the systems and methods of the disclosed subject matter. Together with the description, the drawings serve to explain the principles of the disclosed subject matter.

DETAILED DESCRIPTION

Figure 1:
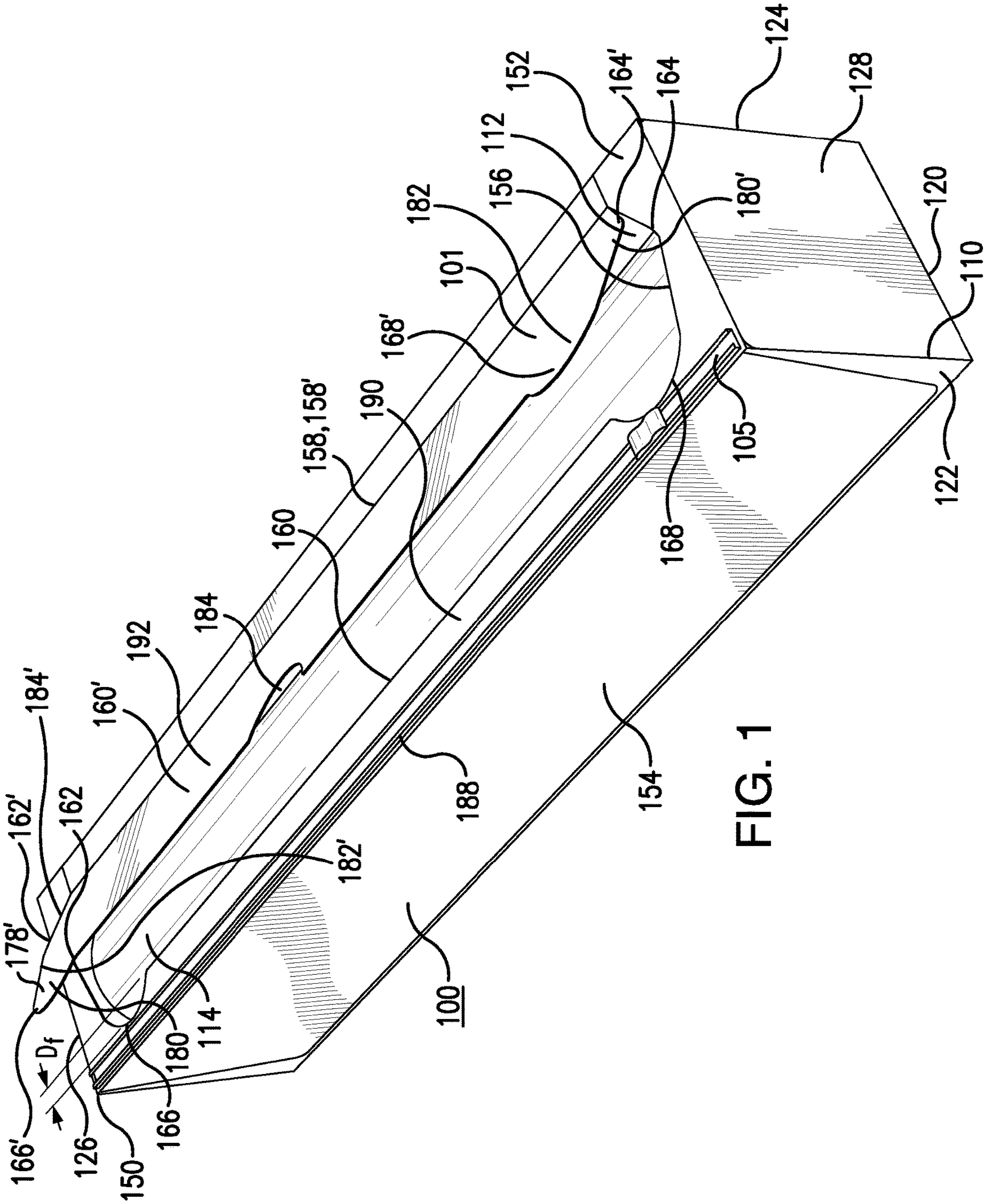
FIG. 1 is a front, perspective view of an exemplary container in accordance with the disclosed subject matter, shown with an access flap in an open position and a roll of web material disposed in the exemplary container.

Reference will now be made in detail to the various exemplary embodiments of the disclosed subject matter, which are illustrated in the accompanying drawings. The structure and corresponding method of operation of the disclosed subject matter will be described in conjunction with the detailed description of the system. The accompanying drawings, where like reference numerals refer to identical or functionally similar elements throughout the separate views, serve to further illustrate various embodiments and to explain various principles and advantages all in accordance with the disclosed subject matter.

The disclosed subject matter is generally directed to containers, blanks, and methods for dispensing web material, such as plastic wrap. Containers for dispensing web material in accordance with the disclosed subject matter generally include a base portion defining a compartment. The base portion includes a bottom panel defining a bottom of the compartment, a front base panel defining a front of the compartment and extending upwardly from the bottom panel. The base portion further includes a back panel extending from the bottom panel to define a back of the compartment, and a plurality of side tabs extending between the bottom panel, the front base panel, and the back panel at opposing sides thereof to define opposing sides of the compartment.

Containers in accordance with the disclosed subject matter further include a lid portion. The lid portion includes a top panel defining a top of the lid portion, the top panel hingedly-coupled to the back panel. The lid portion further includes a front lid panel extending from the top panel along the front base panel. The top panel includes an access flap moveable between an open position for access to the compartment and a closed position defining an opening in the top panel. The opening in the top panel includes an opening back edge, an opening front edge opposite the opening back edge, and first and second opening side edges extending therebetween to define opposing sides of the opening. The opening further includes a first front opening protrusion extending between the opening front edge and the first opening side edge, and a second front opening protrusion extending between the opening front edge and the second opening side edge. A web material can be dispensed through the opening when the access flap is in the open position.

For purpose of explanation and illustration, and not limitation, exemplary containers and blanks in accordance with the disclosed subject matter are shown in FIGS. 1-5. Containers, blanks, and methods in accordance with the disclosed subject matter are suitable for use with a wide variety of webbed material, including for example, plastic wrap, butcher paper, aluminum foil, tape, parchment paper, wax paper, aluminum foil, fabric and the like.

For purpose of illustration, and not limitation, reference will be made to an exemplary embodiment of a container, or dispensing container, for dispensing web material. As used herein, the terms “front,” “end,” “side,” “top,” and “bottom” are used for the purpose of illustration only, and not limitation. That is, it is recognizable that the terms “front,” “end,” “side,” “top,” and “bottom” are interchangeable and are merely used herein as a point of reference. Additionally, as used herein, the term “score line” includes a line incised or otherwise cut into, either partially or entirely through, the surface of the container or the blank used to form the container of the disclosed subject matter, and the term “fold line” includes a line of weakness or bending formed in the surface of the container or the blank used to form the container of the disclosed subject matter.

For purpose of illustration and not limitation, a front, perspective view of an exemplary embodiment of a container 100 is shown in FIG. 1. In accordance with the disclosed subject matter, and with reference to FIG. 1, the container 100 includes a base portion 110 defining a compartment 112. For purpose of illustration not limitation, a roll 114 of web material can be stored and dispensed using the compartment. For purpose of illustration not limitation, suitable web materials can include plastic wrap, aluminum foil, parchment paper, and the like. The base portion 110 includes a bottom panel 120 defining a bottom of the compartment 112. The base portion 110 further includes a front base panel 122 defining a front of the compartment 112. The front base panel 122 extends upwardly from the bottom panel 120. The base portion 110 further includes a back panel 124 extending from the bottom panel 120 to define a back of the compartment 112.

In accordance with the disclosed subject matter, the container 100 includes first and second side tabs defining opposing sides of the compartment 112. The container 100 includes a first side tab 126 extending between the bottom panel 120, the front base panel 122, and the back panel 124 to define a first side of the compartment 112. The container 100 includes a second side tab 128 extending between the bottom panel 120, the front base panel 122, and the back panel 124 to define a second, opposing, side of the compartment 112. The first and second side tabs 126 and 128 can each include front base panel side tabs, bottom panel side tabs, and back panel side tabs, as described further herein.

In accordance with the disclosed subject matter, and with reference to FIG. 1, the container 100 further includes a top portion 150 including a top panel 152 and a front lid panel 154. The top panel 152 extends from the back panel 124 to define a top of the compartment 112. The front lid panel 154 extends from the top panel 152 along the front base panel 122. The top panel further includes an access flap 101 and an opening 156. The access flap 101 is moveable between an open position for access to the compartment 112 and a closed position and defines the opening 156. As shown in FIG. 1, the access flap 101 is in the open position. For purpose of illustration not limitation, the access flap 101 can be hinged along an access flap back edge 158' to open from the close position toward the open position, or the access flap 101 can be removed entirely.

The access flap 101 includes the access flap back edge 158' and an access flap front edge 160' opposite the access flap back edge 158'. The access flap 101 further includes first and second access flap side edges 162' and 164' extending between the access flap back edge 158' and the access flap front edge 160' to define opposing sides of the access flap. The access flap front edge 160', when the access flap is in a closed position, is spaced from a top panel front edge 188 to define a front ledge region 190 therebetween. The access flap front edge 160' includes a first front edge protrusion 166' proximate a first end of the access flap front edge, and a second front edge protrusion 168' protrusion proximate a second end of the access flap front edge.

As embodied herein, each of the first and second front edge protrusions 166' and 168' can have a curved shape. Additionally or alternatively, the first front edge protrusion 166' can include a first arc and the second front opening protrusion 168' can include a second arc. As embodied herein, the first and second arcs can each have an arc radius of about 16.9 mm.

As further embodied herein, the access flap front edge 160' can include a front edge linear portion 192 between the first and second front edge protrusions 166' and 168'. The first front edge protrusion 166' can extend towards the top front edge 188 a first front protrusion distance from the front edge linear portion, which is the same as the distance as $D_f$ noted in FIG. 1. As embodied herein, the front opening protrusion distance $D_f$ can be about 9 mm. Likewise, the second front edge protrusion 168' can extend towards the top front edge 188 a second front protrusion distance from the front edge linear portion 192. As embodied herein, the first front protrusion distance and the second front protrusion distance can be the same.

As embodied herein, the front edge linear portion 192 can be parallel with the top front edge 190 and spaced a distance of about 16 mm from the top front edge 190. Additionally or alternatively, the first front edge protrusion 166' can be disposed between the front edge linear portion 192 and the first access flap side edge 162', and the second front edge protrusion 168' can be disposed between the front edge linear portion 192 and the second access flap side edge 164'.

As further embodied herein, the access flap first side edge 162' can include a first side edge protrusion 178' disposed between access flap front edge 160' and the access flap back edge 158'. Additionally or alternatively, the access flap second side edge 164' can include a second side edge protrusion 180' disposed between access flap front edge 160' and the access flap back edge 158'. As further embodied herein, the first front edge protrusion 166' can transition into the first side edge protrusion 178' and the second front edge protrusion 168' can transition into the second side edge protrusion 180'. The first and second side edge protrusions 178', 180' can have any desirable shape. For example and as embodied herein, each of the first and second side edge protrusions 178', 180' can have an angular shape defining a pinnacle. Additionally or alternatively, the first side edge protrusion 178' can include a first side edge front segment 182' extending from the first front edge protrusion at a first front segment angle of about 120 degrees relative to the top front edge 188. The first front edge protrusion 166' can further include a first side edge back segment 184' extending from the first front segment 182' at a first back segment angle of about 45 degrees relative to the base-lid hinge line. As further embodied herein, the pinnacle of each of the first and second side edge protrusions can be spaced apart a distance (W) equal to or greater than a length of roll of web material to be disposed within the compartment.

As described above, the access flap 101 defines an opening 156. As embodied herein, the shape of the opening 156 defined by the access flap 101 generally corresponds to the shapes of the front and side edges of the access flap 101. For example, the opening 156 includes an opening back edge 158, an opening front edge 160, a first opening side edge 162, and a second opening side edge 164. The first and second opening side edges 162, 164 define opposing sides of the opening 156. The opening 156 further includes a first front opening protrusion 166 extending between the opening front edge 160 and the first opening side edge 162, and a second front opening protrusion 168 extending between the opening front edge 160 and the second opening side edge 164. For purpose of illustration not limitation, the opening front edge 160 can define the front ledge region 190 used when dispensing a sheet of a web material from the compartment 112 through the opening 156.

As embodied herein, the first and second front opening protrusions 166 and 168 can each include a curved shape. As further embodied herein, the first and second front opening protrusions 166 and 168 can each include an arc. For purpose of illustration not limitation, an arc radius for the first and second front opening protrusions 166 and 168 can be about 16.9 mm. For purpose of illustration not limitation, the first front opening protrusion 166 can extend from the opening ledge 160 towards the front lid panel 154 to define a first front opening protrusion depth $D_f$. As embodied herein, the first front opening protrusion depth can be about 7 mm. Likewise, the second front opening protrusion 168 can extend from the opening ledge 160 towards the front lid panel 154 to define a second front opening protrusion depth $D_f$. As embodied herein, the first and second front opening protrusion depths can be the same. For purpose of illustration not limitation, a web material can be pulled through the first and second front opening protrusions 166, 168 and clung onto the opening front edge 160 when it is being dispensed from the compartment 112. Pulling the web material through the first and second front opening protrusions 166, 168 can effectively avoiding wrinkling or clumping the web material.

For purpose of illustration not limitation, the access flap 101 can further include a first front flap notch 180 configured to seal the first front opening protrusion 166 and a second front flap notch 182 configured to seal the second front opening protrusion 168 when the access flap 101 is in the closed position. For purpose of illustration not limitation, the access flap 101 can further include a center recess 184 on a side between the first flap notch 180 and the second flap notch 182. When the access flap 101 is in the closed position, the center recess 184 can be poked for moving the access flap 101 to an open position.

For purpose of illustration not limitation, as embodied and described herein, the first and second side tabs 126, 128 can include first and second front side tabs extending from the front base panel 122 at opposing sides, first and second bottom side tabs extending from the bottom panel 120 at opposing sides, and first and second back side tabs extending from the back panel 124 at opposing sides.

For purpose of illustration not limitation, as embodied herein, a cutter assembly can be disposed on the top panel between the opening front edge 160 and the front lid panel 154 to cut the web material when it is dispensed through the opening 156. A variety of cutter assemblies are known and can be used with the dispensing container of the disclosed subject matter. For example, suitable cutter assemblies are described in U.S. Pat. Nos. 7,918,151 and 7,921,756, each of which is incorporated by reference herein in its entirety.

Figure 2:
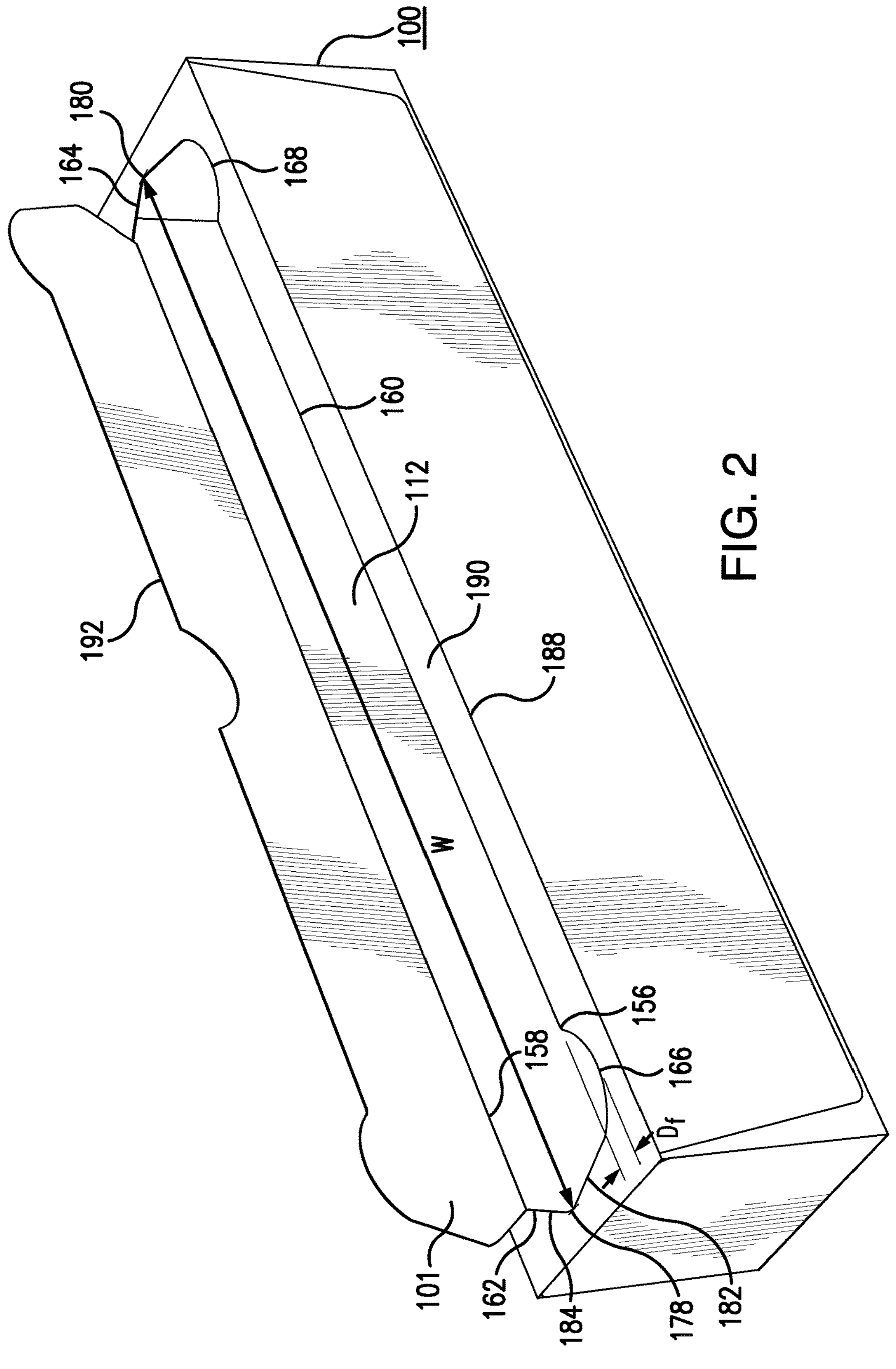
FIG. 2 is a front, perspective view of the exemplary container of FIG. 1, shown with an opening of the container in plan view.

For purpose of illustration and not limitation, FIG. 2 is a front, perspective view of the exemplary container 100 in accordance with the disclosed subject matter with the opening 156 in plan view. For purpose of illustration not limitation, the cutter assembly is not depicted in FIG. 2. As shown in FIG. 2, the access flap 101 is in an open position.

For purpose of illustration not limitation, the opening 156 includes an opening back edge 158, an opening front edge 160, a first opening side edge 162, and a second opening side edge 164. The first and second opening side edges 162, 164 define opposing sides of the opening 156. The opening 156 further includes a first front opening protrusion 166 extending between the opening front edge 160 and the first opening side edge 162, and a second front opening protrusion 168 extending between the opening front edge 160 and the second opening side edge 164. For purpose of illustration not limitation, the opening front edge 160 can be used as a clinging ledge when dispensing a sheet of a web material from the compartment 112 through the opening 156.

As embodied herein, the first and second front opening protrusions 166 and 168 can each include a curved shape. As further embodied herein, the first and second front opening protrusions 166 and 168 can each include an arc. For purpose of illustration not limitation, an arc radius for the first and second front opening protrusions 166 and 168 can be about 16.9 mm. For purpose of illustration not limitation, the first front opening protrusion 166 can extend from the opening ledge 160 towards the front lid panel 154 to define a first front opening protrusion depth $D_f$. As embodied herein, the first front opening protrusion depth can be about 7 mm. Likewise, the second front opening protrusion 168 can extend from the opening ledge 160 towards the front lid panel 154 to define a second front opening protrusion depth $D_f$. As embodied herein, the first and second front opening protrusion depths can be the same. For purpose of illustration not limitation, a web material can be pulled through the first and second front opening protrusions 166, 168 and clung onto the opening front edge 160 when it is being dispensed from the compartment 112. Pulling the web material through the first and second front opening protrusions 166, 168 can effectively avoiding wrinkling or clumping the web material.

For purpose of illustration not limitation, the opening 156 can further include a first opening side edge protrusion 178 extending between the first front opening protrusion 166 and the first opening side edge 162, and a second opening side edge protrusion 180 extending between the second front opening protrusion 168 and the second opening side edge 164. As embodied herein, the first and second opening side edge protrusions 178, 180 can each have an angular shape, and provide access to the compartment on either side of a roll disposed in the compartment 112. As embodied herein, the first and second opening side edge protrusions 178, 180 can each include a pinnacle. The two pinnacles can each define a center of access to a roll disposed in the compartment 112. For purpose of illustration not limitation, a distance W between the two pinnacles can accommodate a length of the roll of web material when the web material is dispensed through the opening without wrinkling or clumping the web material. As embodied herein, the distance W between the two pinnacles can be about or slightly over 306 mm. For purpose of illustration not limitation, the two pinnacles can each correspond to a center of a roll disposed in the compartment. As embodied herein, the first opening side edge protrusion 178 includes a first front segment 182 extending from the first front opening protrusion 166 at a first front segment angle of about 120 degrees relative to the opening front edge 160. The first opening side edge protrusion 178 includes a first rear segment 184 extending from the first front segment 182 at a first rear segment angle of about 45 degrees relative to the opening front edge 160. Likewise, the second opening side edge protrusion 180 can include a similar configuration, including a second front segment at a second front segment angle of about 60 degrees relative to the opening front edge 160, and a second rear segment at a second rear segment angle of about 135 degrees relative to the opening front edge 160.

Figure 3:
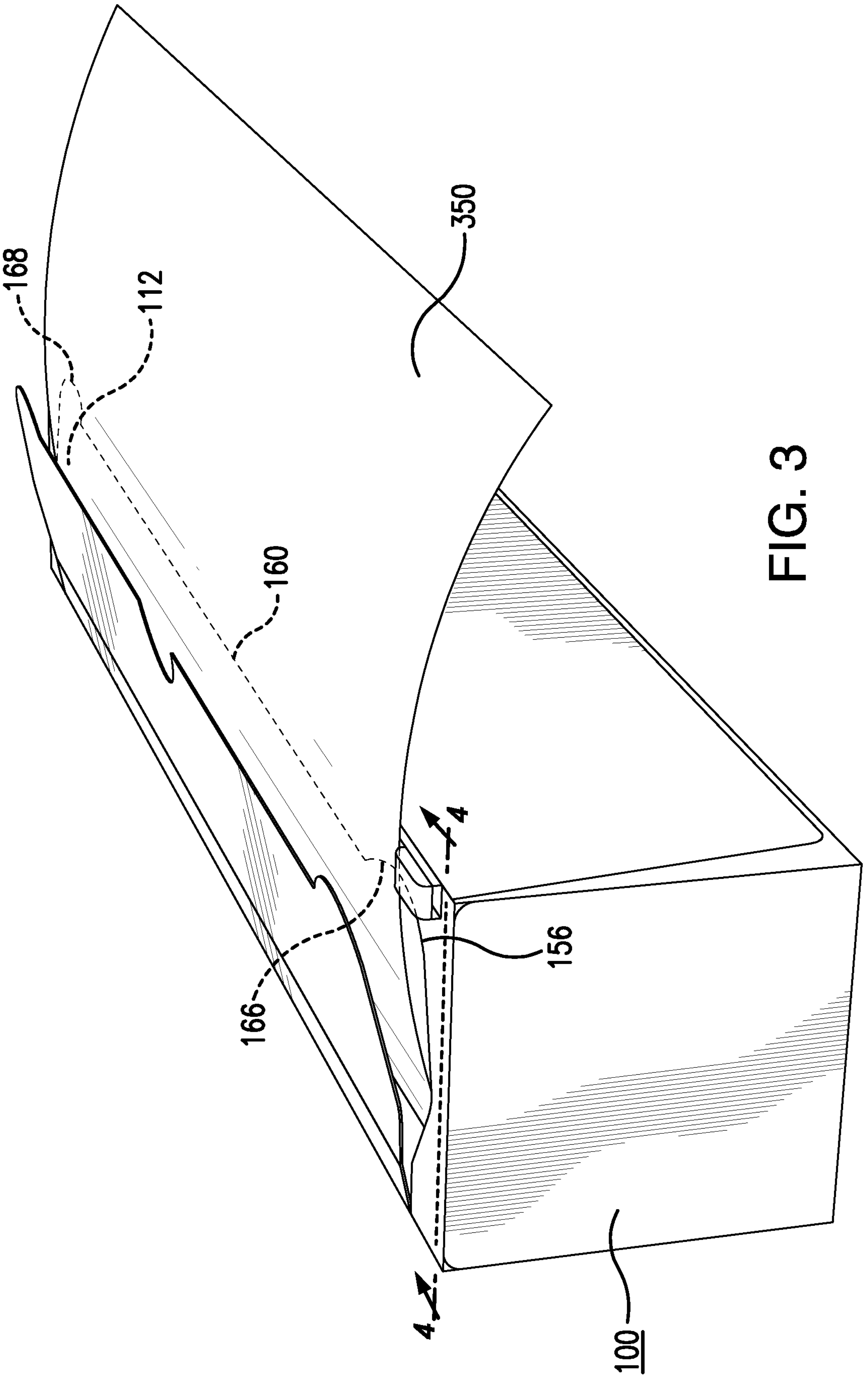
FIG. 3 is a side, perspective view of the exemplary container of FIG. 1, shown with a sheet of a web material being dispensed from the opening of the container.

For purpose of illustration and not limitation, a front, perspective view of the exemplary container 100 in accordance with the disclosed subject matter with the access flap 101 in a dispensing position is shown in FIG. 3. In accordance with the disclosed subject matter, and with reference to FIG. 3, web material 350 can be dispensed through the opening 156 defined in the top panel 152 along the front ledge region, as described above. As embodied herein, the sheet of web material 350 can be pulled through the opening 156 and clung upon front ledge region. The opening 156 can include the first and second opening side edge protrusions 178, 180, each including a pinnacle defining a center of access to a roll disposed in the compartment 112. As embodied herein, the distance W between the two pinnacles can be about or slightly over 306 mm. As embodied herein, the two pinnacles can each correspond to a center of a roll of the web material 350 disposed in the container. The distance is configured to accommodate a length of the roll so that when the web material is dispensed, both sides of the web material 350 would not be wrinkled or clumped. For purpose of illustration not limitation, the web material 350 can be directed from the opening 156 towards the cutter assembly 105 and cut using the cutter assembly 105.

Figure 4:
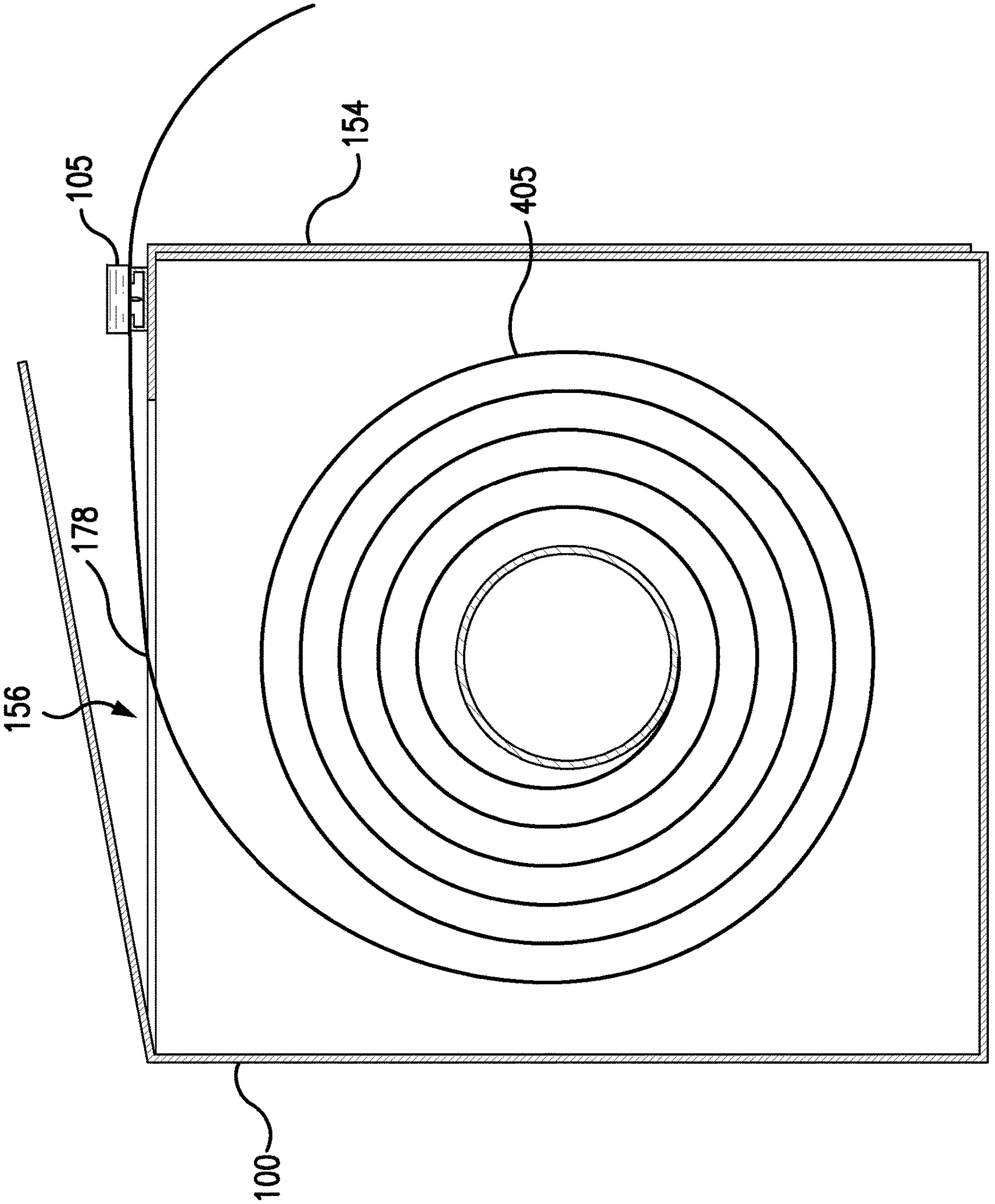
FIG. 4 is a side cross-sectional view of the exemplary container of FIG. 1 taken along line 4-4 as depicted in FIG. 3, shown with the sheet of the web material being dispensed from the opening.

For purpose of illustration and not limitation, a cross-section view of the exemplary container 100 in accordance with the disclosed subject matter along line 4-4 in FIG. 3 is shown in FIG. 4. In accordance with the disclosed subject matter, and with reference to FIG. 4, the container 100 can dispense a sheet of web material from a roll 405 in the compartment. As embodied herein, the cutter assembly 105 can be disposed between the opening 156 and the front lid panel 154 of the container 100. One side of the sheet of web material can be disposed between the first opening side edge protrusion 178 and the cutter assembly 105. As embodied herein, the pinnacle of the first opening side edge protrusion 178 can correspond to the center of the roll 405. The sheet of the web material can be dispensed through the opening 156 towards the cutter assembly 105, and cut by the cutter assembly 105, without wrinkling or clumping the web material.

For purpose of illustration and not limitation, in accordance with the disclosed subject matter, a method of dispensing web material from a roll is disclosed herein. The method includes providing a container according to the disclosed subject matter herein, disposing a roll of web material in the container, and dispensing web material from the roll through the opening, the web material being directed along the opening front edge. For purpose of illustration not limitation, as embodied herein, dispensing web material from the roll can include pulling the web material through a first and second front opening protrusions of the container and clinging the web material onto an opening front edge of the container as disclosed herein. Additionally or alternatively, dispensing the web material from the roll can include using a cutter assembly to cut the web material disposed on a top panel between the opening front edge and a front lid panel of the container. The web material can be directed from the opening front edge to the cutter assembly disposed on the container.

Figure 5:
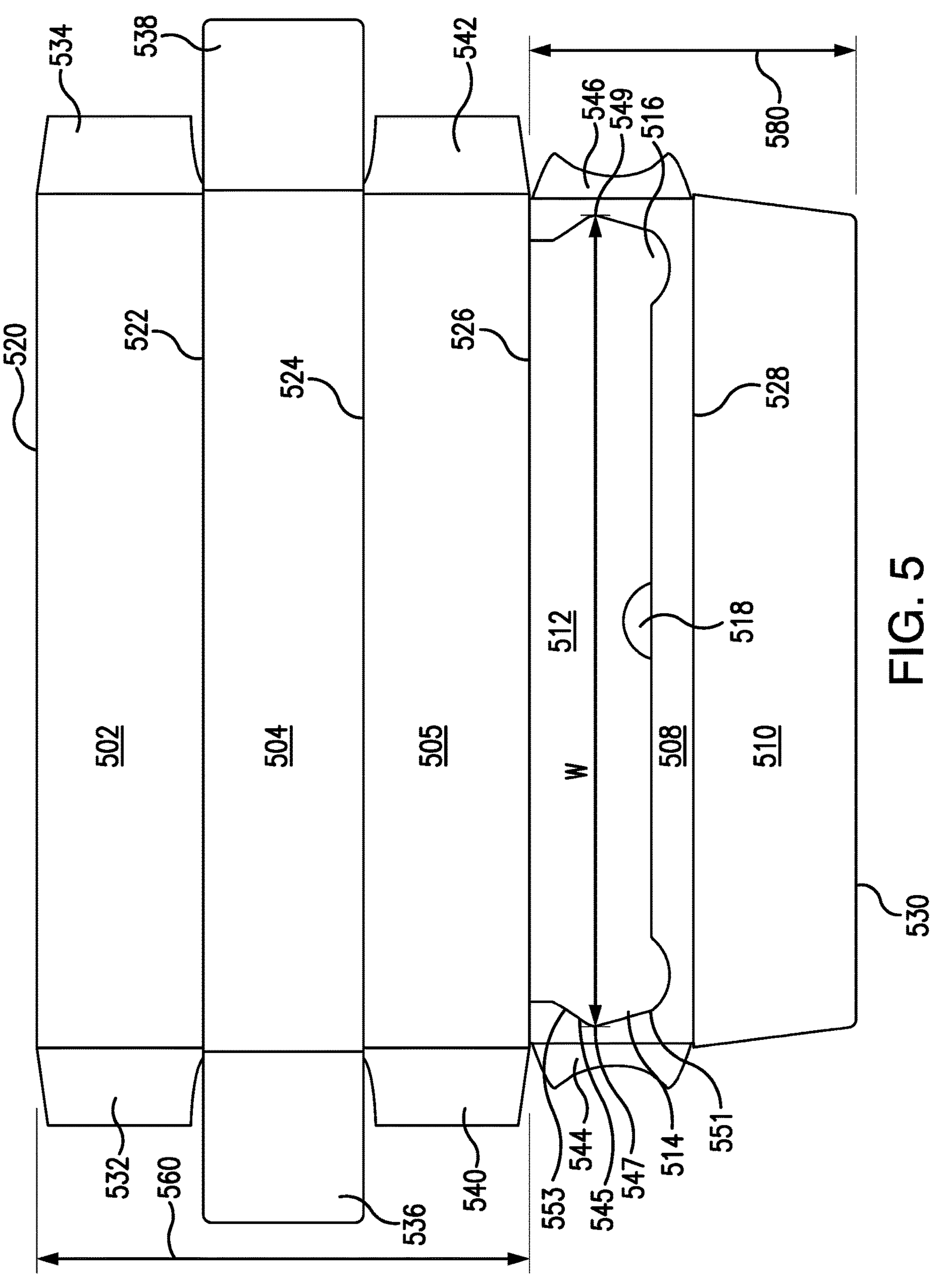
FIG. 5 is a plan view of an exemplary blank in accordance with the disclosed subject matter.
Figure 6:
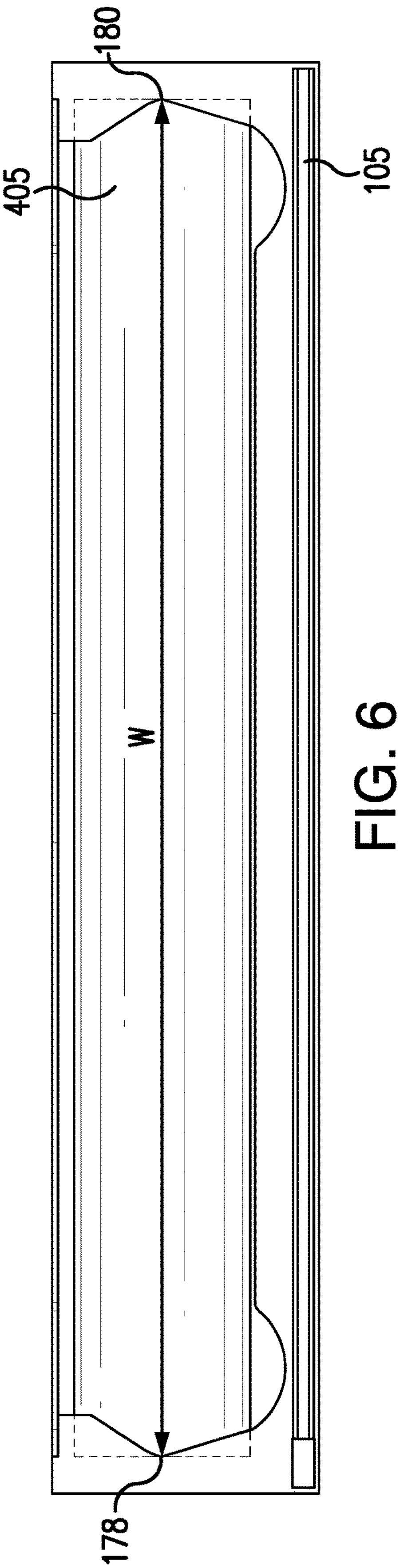
FIG. 6 is a top view of the exemplary container of FIG. 1, shown with a roll of web material disposed in the container.

The disclosed subject matter further includes blanks for forming containers. For purpose of illustration not limitation, an exemplary blank according to the disclosed subject matter is shown in FIG. 5. As embodied herein, an exemplary blank for forming a container includes a base portion 560 having a front base panel 502 having a top edge 520 and a front base panel fold line 522 opposite the top edge 520. The front base panel further includes opposing first and second front base side fold lines, a first front base side tab 532 extending from the first front base side fold line, and a second front base side tab 534 extending from the second front base side fold line. The base portion 560 further includes a bottom panel 504 extending from the front base panel fold line 522 to a back base panel fold line 524. The bottom panel 504 includes opposing first and second bottom side fold lines, a first bottom side tab 536 extending from the first bottom side fold line, and a second bottom side tab 538 extending from the second bottom side fold line. The base portion 560 further includes a back panel 506 extending from the front base panel fold line 524 to a base-lid hinge line 526. The back panel 506 includes opposing first and second back side fold lines, a first back side tab 540 extending from the first back side fold line, and a second back side tab 542 extending from the second back side fold line.

Blanks in accordance with the disclosed subject matter further include a lid portion 580. The lid portion includes a top panel 508 extending from the base-lid hinge line 526 to a top front fold line 528, and a front lid panel 510 extending from the top front fold line 528.

For purpose of illustration not limitation, the top panel 508 includes an access flap 512 defining an opening 545. For purpose of illustration not limitation, the access flap includes a center recess 518, a first front flap notch 514, and a second front flap notch 516. As embodied herein, the first front flap notch and second front flap notch 514, 516 each include an arc shape. For purpose of illustration not limitation, a radius for the arc shape is about 15 mm.

For purpose of illustration and not limitation, the opening 545 defined by the access flap 512 includes a first opening side edge protrusion 547 and a second opening side edge protrusion 549. As embodied herein, a distance between the first and second opening side edge protrusions 547, 549 can be about 306 mm. As embodied herein, the first opening side edge protrusion 547 can include a first front segment 551 and a first rear segment 553. The first front segment extends from the first front flap notch 514 at a first front segment angle of about 120 degrees relative to the top front fold line 528. The first rear segment 553 extends from the first front segment 551 at a first rear segment angle of about 45 degrees relative to the top front fold line 528.

For purpose of illustration and not limitation, a top view of the exemplary container 100 in accordance with the disclosed subject matter is shown in FIG. 5. For purpose of illustration not limitation, the container 100 can include the cutter assembly 105 disposed on the top panel. For purpose of illustration not limitation, the two pinnacles of the first and second opening side edge protrusions 178, 180 can each correspond to a center of the roll 405 disposed in the container. As embodied herein, the distance W between the two pinnacles can be about or slightly longer than 306 mm.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A container for dispensing web material from a roll, the container comprising:

a base portion defining a compartment, the base portion having:

a bottom panel defining a bottom of the compartment, a front base panel extending upwardly from the bottom panel to define a front of the compartment, a back panel extending from the bottom panel to define a back of the compartment, and a plurality of side tabs extending from at least one of the front base panel, the bottom panel and the back panel to define opposing sides of the compartment; and a lid portion, the lid portion having:

a top panel extending from the back panel along a base-lid hinge line to define a top of the compartment, the top panel having a top front edge opposite the base-lid hinge line and first and second top side edges, the top panel having an access flap defined therein and moveable between a closed position and an open position to define an opening in the top panel for access to the compartment, the access flap comprising an access flap back edge, an access flap front edge opposite the access flap back edge, and first and second access flap side edges extending between the access flap back edge and the access flap front edge to define opposing sides of the access flap, the access flap front edge being spaced from top panel front edge to define a front ledge region therebetween, the access flap front edge having a first front edge protrusion proximate a first end of the access flap front edge and a second front edge protrusion proximate a second end of the access flap front edge; and a front lid panel extending from top front edge of the top panel.

2. The container of claim 1, wherein the first front edge protrusion includes a first arc and the second front opening protrusion includes a second arc, and wherein the access flap front edge includes a front edge linear portion between the first and second front edge protrusions.

3. The container of claim 2, wherein the first front edge protrusion extends towards the top front edge a first front protrusion distance from the front edge linear portion, the front opening protrusion distance being about 9 mm, and wherein the first and second arcs each have an arc radius of about 16.9 mm.

4. The container of claim 2, wherein the first front edge protrusion is disposed between the front edge linear portion and the first access flap side edge, and the second front edge protrusion is disposed between the front edge linear portion and the second access flap side edge.

5. The container of claim 1, wherein the access flap first side edge includes a first side edge protrusion disposed between access flap front edge and the access flap back edge, and the access flap second side edge includes a second side edge protrusion disposed between access flap front edge and the access flap back edge.

6. The container of claim 5, wherein each of the first and second side edge protrusions has an angular shape defining pinnacle, the pinnacle of each of the first and second side edge protrusions being spaced apart a distance equal to or greater than a length of roll of web material to be disposed within the compartment.

7. The container of claim 1, wherein the access flap back edge is defined by the base-lid hinge line.

8. The container of claim 1, wherein the top panel further comprises a recess tab defined proximate the access flap front edge between the first front edge protrusion and the second front edge protrusion.

9. The container of claim 1, wherein the access flap is further moveable to a dispensing position to allow a web material from a roll disposed in the compartment to be dispensed between access flap front edge and the front ledge region of the top panel.

10. The container of claim 1, further comprising a cutter disposed proximate the top front edge of the top panel.

11. The container of claim 1, wherein the top panel further comprises first and second top side tabs extending from the first and second top side edges, respectively, each of the first and second side tabs configured to engage the roll of web material.

12. A blank comprising:

a base portion having:

a front base panel having a front base panel free edge and a front base panel fold line opposite the front base panel free edge, the front base panel having opposing first and second front base side fold lines, first and second front side tabs extending from the first and second front base side fold lines, respectively, a bottom panel extending from the front base panel fold line to a bottom panel fold line, the bottom panel having opposing first and second bottom side fold lines, first and second bottom side tabs extending from the first and second bottom side fold lines, respectively, a back panel extending from the bottom panel fold line to a base-lid hinge line, the back panel having opposing first and second back side fold lines, and first and second back side tabs extending from the first and second back side fold lines, respectively; and a lid portion, the lid portion having:

a top panel extending from the base-lid hinge line to a top front fold line, the top panel having an access flap defined therein to define an opening in the top panel, the access flap comprising an access flap back edge, an access flap front edge opposite the access flap back edge, and first and second access flap side edges extending between the access flap back edge and the access flap front edge to define opposing sides of the access flap, the access flap front edge being spaced from top panel front edge to define a front ledge region therebetween, the access flap front edge having a first front edge protrusion proximate a first end of the access flap front edge and a second front edge protrusion proximate a second end of the access flap front edge; and a front lid panel extending from the top front fold line.

13. The blank of claim 12, wherein the first front edge protrusion includes a first arc and the second front opening protrusion includes a second arc and wherein the access flap front edge includes a front edge linear portion between the first and second front edge protrusions.

14. The blank of claim 13, wherein the first front edge protrusion extends towards the top front edge a first front protrusion distance from the front edge linear portion, the front opening protrusion distance being about 9 mm, and wherein the first and second arcs each have an arc radius of about 16.9 mm.

15. The blank of claim 13, wherein the first front edge protrusion is disposed between the front edge linear portion and the first access flap side edge, and the second front edge protrusion is disposed between the front edge linear portion and the second access flap side edge.

16. The blank of claim 12, wherein the access flap first side edge includes a first side edge protrusion disposed between access flap front edge and the access flap back edge, and the access flap second side edge includes a second side edge protrusion disposed between access flap front edge and the access flap back edge.

17. The blank of claim 16, wherein each of the first and second side edge protrusions has an angular shape defining a pinnacle, the pinnacle of each of the first and second side edge protrusions being spaced apart a distance equal to or greater than a length of roll of web material to be disposed within the compartment.

18. The blank of claim 12, wherein the access flap back edge is defined by the base-lid hinge line.

19. The blank of claim 12, wherein the top panel further comprises a recess tab defined proximate the access flap front edge between the first front edge protrusion and the second front edge protrusion.

20. The blank of claim 12, wherein the top panel further comprises first and second top side tabs extending from a first and second top side fold lines, respectively.

21. A method of dispensing web material from a roll, the method comprising:

providing a container, the container including a base portion defining a compartment and a lid portion comprising an access flap between an open position for access to the compartment and a closed position;

the base portion having:

a bottom panel defining a bottom of the compartment, a front base panel extending upwardly from the bottom panel to define a front of the compartment, a back panel extending from the bottom panel to define a back of the compartment, and a plurality of side tabs extending from at least one of the front base panel, the bottom panel and the back panel to define opposing sides of the compartment; and a lid portion, the lid portion having:

a top panel extending from the back panel along a base-lid hinge line to define a top of the compartment, the top panel having a top front edge opposite the base-lid hinge line and first and second top side edges, the top panel having an access flap defined therein and moveable between a closed position and an open position to define an opening in the top panel for access to the compartment, the access flap comprising an access flap back edge, an access flap front edge opposite the access flap back edge, and first and second access flap side edges extending between the access flap back edge and the access flap front edge to define opposing sides of the access flap, the access flap front edge being spaced from top panel front edge to define a front ledge region therebetween, the access flap front edge having a first front edge protrusion proximate a first end of the access flap front edge and a second front edge protrusion proximate a second end of the access flap front edge; and a front lid panel extending from top front edge of the top panel;

disposing a roll of web material in the container; and dispensing web material from the roll through the opening, the web material being directed along the front ledge region.

22. The method of claim 21, wherein the access flap first side edge includes a first side edge protrusion disposed between access flap front edge and the access flap back edge, and the access flap second side edge includes a second side edge protrusion disposed between access flap front edge and the access flap back edge, wherein each of the first and second side edge protrusions has an angular shape defining pinnacle, the pinnacle of each of the first and second side edge protrusions being spaced apart a distance equal to or greater than a length of roll of web material to be disposed within the compartment.

23. The method of claim 21, wherein dispensing web material from the roll includes pulling the web material through the opening and clinging the web material onto the front ledge region.

24. The method of claim 21, wherein dispensing the web material from the roll includes using a cutter to cut the web material on the top panel between the front ledge region and the front lid panel, and wherein the web material being directed from the opening to the cutter.

* * * * *